INVENTORS
HERBERT L. PETERSON
WILLIAM J. FINNEY
John E. Halford AGENT
BY Richard C. Reed
ATTORNEY

SAMPLING DIGITAL DIFFERENTIATOR FOR AMPLITUDE MODULATED WAVE

Filed Aug. 25, 1960 3 Sheets-Sheet 2

INVENTORS
HERBERT L. PETERSON
WILLIAM J. FINNEY
BY John E. Halford AGENT
Richard C. Real
ATTORNEY Aug. 25, 1964 H. L. PETERSON ET AL 3,146,424

SAMPLING DIGITAL DIFFERENTIATOR FOR AMPLITUDE MODULATED WAVE

Filed Aug. 25, 1960 3 Sheets-Sheet 3

INVENTOR
HERBERT L. PETERSON
WILLIAM J. FINNEY

John E. Halford AGENT

BY Richard C. Reed

ATTORNEY

United States Patent Office 3,146,424

Patented Aug. 25, 1964

3,146,424

SAMPLING DIGITAL DIFFERENTIATOR FOR AMPLITUDE MODULATED WAVE

Herbert L. Peterson, 5521 24th Ave., Hillcrest Heights, Md., and William J. Finney, Accokeek, Md.

Filed Aug. 25, 1960, Ser. No. 52,001
6 Claims. (Cl. 340—172.5)
(Granted under Title 35, U.S. Code (1952), sec. 266)

The invention described herein may be manufactured and used by or for the Government of the United States of America for governmental purposes without the payment of any royalties thereon or therefor.

The present invention is directed to a receiver or detector for use in a carrier wave communication system.

In the better known systems of communication using carrier waves the information is contained in relative changes in the carrier frequency, phase, or amplitude. The instantaneous values of these parameters have little significance. The information is also of such a redundant nature that gross errors are easily corrected by taking average values of the information received. A simple audio detector, for home radios for example, stores successive cycles of the carrier in an electrical reservoir and the information is obtained by observing changes in the level of the reservoir over a large number of cycles.

In telemetering systems critical variations often occur in a very few cycles or even two successive cycles of the carrier and are not repeated. It is necessary in such systems, therefore, that the carrier be examined on a cycle to cycle basis with extreme accuracy. Also, since analog data tends to be distorted with processing, it is imperative that the data be converted to digital form with as little handling as possible.

An object of the present invention is, therefore, to provide a carrier wave detector which converts all of the analog data impressed thereon directly to digital form preserving the amplitude, frequency and phase characteristics for subsequent computation or analysis.

Another object of the invention is to provide a carrier wave detector which divides the wave into a large number of amplitude samples on a time basis and converts these samples to digital form preserving a maximum of the information contained in each.

The manner in which these and other objects and attendent advantages of the invention are attained is pointed out in the following specification and claims. The specification is more easily understood by reference to the accompanying drawings wherein:

Figure 1:
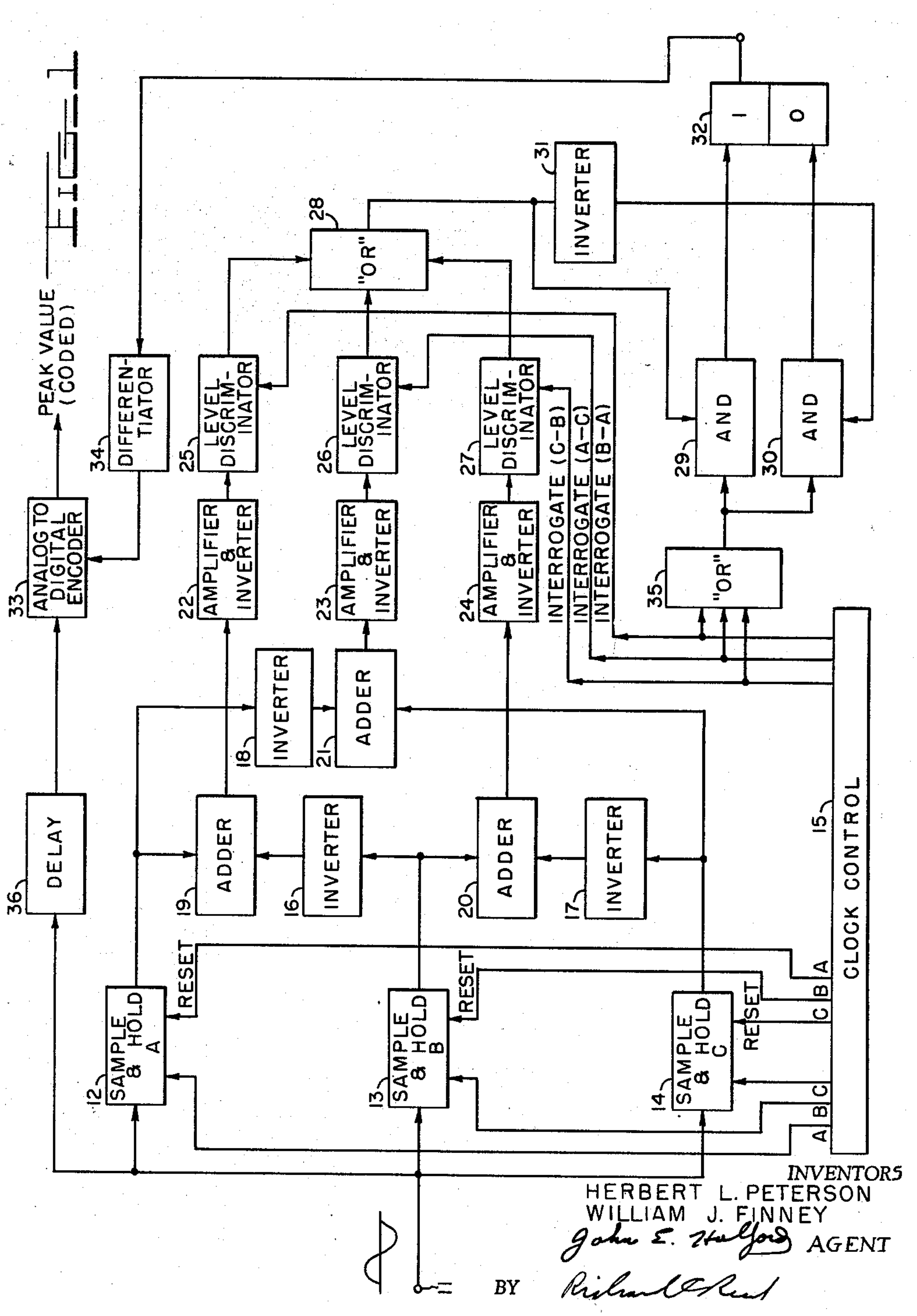
FIG. 1 is an embodiment of the invention in block diagram form.

In the embodiment of FIG. 1 a modulated carrier from an external source (not shown) is applied to input terminal 11, and hence is applied simultaneously to the analog inputs of three Sample and Hold circuits 12–14. These circuits, examples of which may be found in applicants' earlier filed application Serial Number 805,650, filed April 10, 1959, now Patent Number 2,955,203, entitled Signal Demodulator Envelope, hold a sample of the amplitude of the wave applied to the analog input in response to a pulse supplied to its control input. The control input in this case is connected to the sample pulse output of clock control 15. It is preferred that the Sample and Hold circuits include and be controlled by setting one output level of a bistable flip-flop circuit, in which case a reset input is required at the end of each sample. Otherwise the control pulse must be applied over the entire sampling period.

The clock control consists of one or more pulse generators, usually a blocking oscillator synchronized to a crystal controlled oscillator or any available stable frequency source of known period. The control has two additional outputs, a series of reset pulses which are applied to the Sample and Hold circuit to operate the bias flip-flop mentioned above, and a series of interrogation pulses the purpose of which will be described later. The generators for these additional pulses are synchronized through delay networks within the clock control in a conventional manner to occur in proper sequence to one another. In Sample and Hold circuits which do not require resetting the reset pulse generators will be omitted.

Between the outputs of each pair of Sample and Hold circuits there is connected an analog subtractor circuit. Each subtractor includes one of the inverters 16–18 and one of the adders 19–21. The structure of these circuits is well understood in the computer art. The inverters, for example, could be transformers or one stage amplifiers and the analog adders might be a bridge circuit vacuum tube mixer or the like. Each adder produces a signal at its output equal to the difference between that of two Sample and Hold circuits.

The output of each adder is then applied to a suitable amplifier 22–24 and a gated discriminator 25–27. An example of a circuit which could be used in the gated level discriminator is shown on page 531, FIG. 17–16(*b*) of Millman and Taub, Pulse and Digital Circuits published by McGraw-Hill. One of the two inputs would be for gating and would be connected to the "interrogate" line while the other input would be connected to the "amplifier and inverter" 22–24. A voltage comparator circuit as discussed in Chapter 15 of the Millman and Taub publication could alternatively be used in the level discriminator. For example, the circuit shown in FIG. 15–1 of page 460 could be used. If this circuit is employed then a gate input should be provided for the "interrogate" pulse. A second diode input to the comparator would be used for the gate input. The output level can be changed by changing the value of the bias voltage.

The output of the "OR" circuit 28 has two parallel branches one of which contains an inverter 31. Each branch feeds an input of a different one of the "AND" circuits 29 and 30. The remaining inputs of the "AND" circuits are connected to the outputs of the interrogation pulse generator by means of an "OR" gate 35.

The outputs of the "AND" circuits are connected to a bistable flip-flop circuit 32 in double ended fashion, i.e. a pulse of a given polarity from one clamps the flip-flop in one state while a pulse of the same polarity from the other output clamps it in another. The flip-flop circuit output is applied to a differentiator and the differentiator output applied in turn to the trigger input of an Analog-to-Digital encoder 33. The encoder also has its analog input coupled to the common input of the Sample and Hold circuits 12–14. This encoder may be any one of many convention circuits well known in the art, such as the circuit disclosed on page 491 et seq. of the Millman & Taub Publication cited above.

Figure 2:
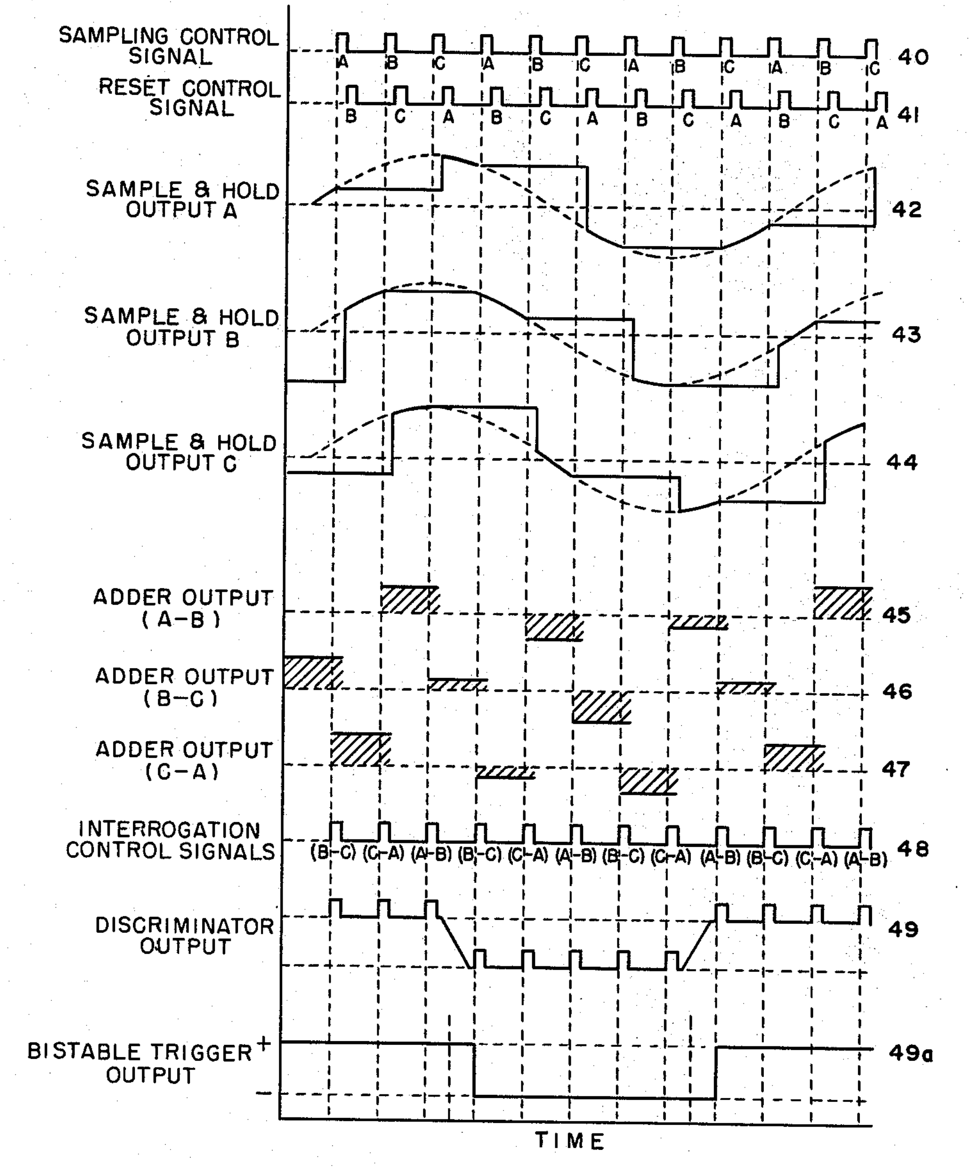
FIG. 2 shows the waveforms at a plurality of points within the circuit of FIG. 1 plotted against a common time base.

Operation of the detector is shown by the curves in FIG. 2. Curved 40 is the sequence of sample control pulses and curve 41 the reset pulses. The sample pulse triggers the bias flip-flop circuit biasing the Sample and Hold gate to its hold position, thereby producing the constant output portions of curves 42–44. The reset pulse flips the bistable bias back to an open-gate condition where the output follows the instantaneous values of the analog input.

Discontinuous curves 45, 46 and 47 show the particular portions of the analog adder outputs, produced by the outputs 42–44, which are of interest. During each of these portions an interrogation pulse, see curve 48, is applied to the level discriminator. If the portion differs in sign from the preceding pulse, the level of the discriminator output drops producing the resultant voltage shown in curve 49. The high level pulses of curve 49 are capable of operating one input of the "AND" gate 29, but the low level pulses are not. The inverter reverses this situation at the "AND" gate 30. The level of the interrogation pulses passing through the "OR" gate 28 sets the position of the flip-flop to correspond to the prevalent level.

The steep slopes of the flip-flop shown as curve 49a in FIG. 2, output are converted to spiked pulses by the differentiating circuit 34 and used to gate the Analog-to-Digital converter 33. If the signals are delayed appreciably before arriving at the trigger input, a compensating analog delay structure 36 is inserted in the path to the analog input of the encoder. The encoded value thus corresponds to the peak of the wave within the resolution time period defined by the two consecutive interrogation pulses. The repetition rate of these pulses is therefore, made greater than any frequency component present in the carrier.

Figure 3:
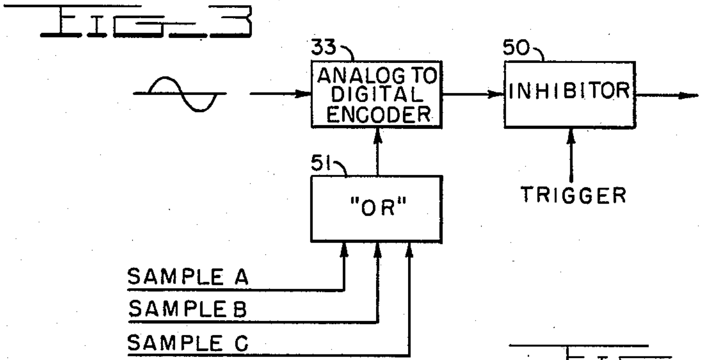
FIG. 3 is a second embodiment of a portion of the circuit of FIG. 1.

FIG. 3 shows a variation of a portion of the circuit shown in FIG. 1. In this embodiment the outputs of each of the Sample and Hold circuits 12–14 is applied to the trigger input of the encoder 33. This insures that the encoder processes the same samples as those analyzed to determine the peak sample. The encoded peak sample is selected by opening a gate 50 with the trigger pulse from FIG. 1. Thus any delay in the subtractors or subsequent networks less than the encoding time of a sample can be ignored. The open period or recovery time of the gate is made long enough to preclude interference with the peak sample and short enough to completely block the subsequent sample.

Figure 4:
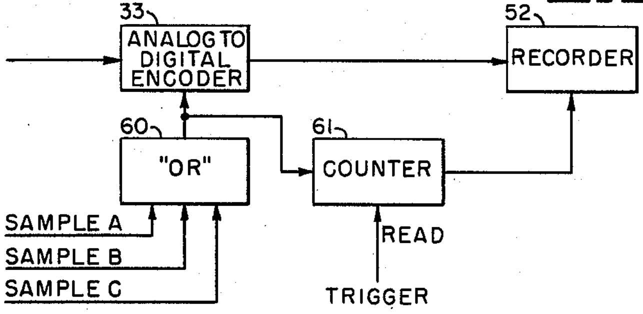
FIG. 4 is a third embodiment of a portion of the circuit of FIG. 1.

FIG. 4 shows a portion of an embodiment designed to utilize all of the samples obtained. This arrangement is like that shown in FIG. 1 except that the encoder is triggered by the sample pulses which have been combined in an "OR" gate 60. The trigger pulses previously used for this purpose are applied to the "read" input of a counter circuit 61. The counter is driven by the clock controlled sample pulses from the "OR" gate 60.

The encoder and counter outputs are then fed in parallel or serially to a tape recorder 52 or other utilization device. Parallel feed is convenient for counters which reset after each readout accumulating only the time periods between successive peaks. One or more additional channels in the recorder or utilization device will suffice to handle such information. For greater accuracy a non-resetting counter may be used to indicate the time from some arbitrary, fixed starting time. These are then recorded in the same channels used by the encoder, either just preceding or following the peak sample.

Figures 5, 6:
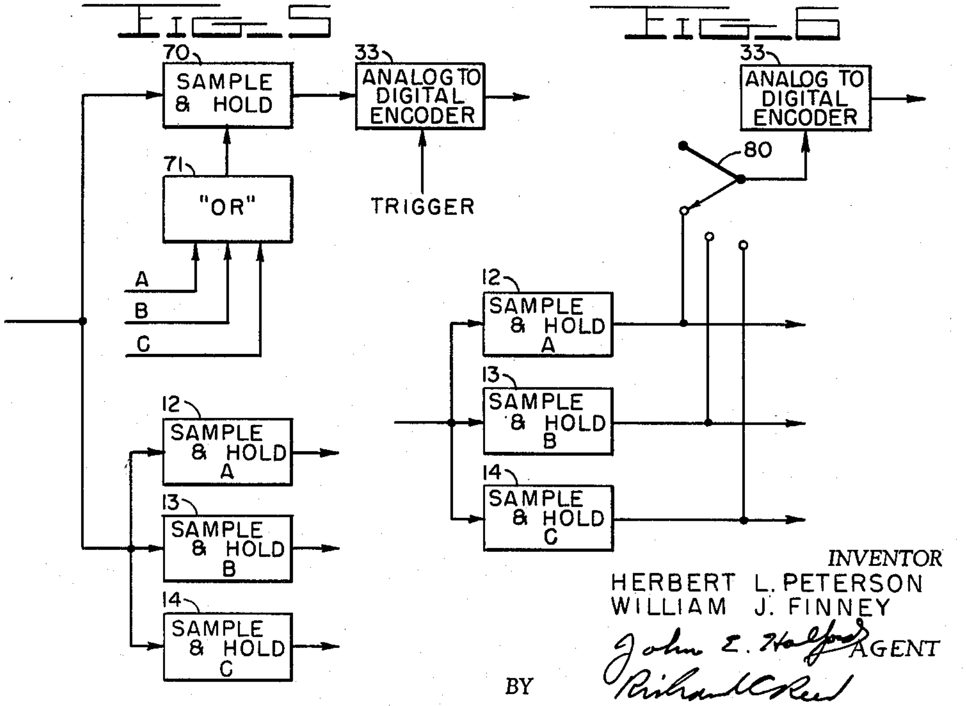
FIG. 5 is a fourth embodiment of a portion of the circuit of FIG. 1.
FIG. 6 is a fifth embodiment of a portion of the circuit of FIG. 1.

FIG. 5 shows a further embodiment of a portion of FIG. 1. In this system the analog delay circuit is replaced by a Sample and Hold circuit 70 similar to circuits 12–14. This not only effectively delays the samples, but also quantizes the encoder input. As a result the encoder structure may be less complex, i.e. no storage registers are required. The additional Sample and Hold circuit is controlled by the sample pulses combined in the "OR" gate 71.

Yet another embodiment of a portion of the structure in FIG. 1 is shown in FIG. 6. In this arrangement the encoder is fed from the common pole of a rotary single pole multi-throw switch 80. The switch has a separate contact connected to the outputs of each of the Sample and Hold circuits. The switch is driven in synchronism with the clock control, so that the most recent sample is always applied to the encoder. Where the sampling frequency is too high for mechanical switching electronic relays tripped by the sampling pulses may be substituted in accordance with principles well understood in the art.

Obviously many modifications and variations of the present invention are possible in the light of the above teachings. It is therefore to be understood that within the scope of the appended claims the invention may be practical otherwise than as specifically described.

What is claimed is:

1. A detector for converting the analog data contained in a modulated carrier wave to digital form comprising, a plurality of Sample and Hold circuit means having a common input and "*n*" outputs, where "*n*" is an integer greater than one, to simultaneously store the amplitude of said carrier at the beginning of each of "*n*" consecutive time intervals, a sequence of "*n*" subtractor means each interconnecting a sequentially operated pair of Sample and Hold circuit means for extracting difference signals each of which is equal to the difference between the earlier and later samples held therein, trigger circuit means connected to said subtractors and responsive to said difference signals for generating a trigger signal as said difference signals change polarity, an analog-to-digital encoder means coupled to said each of said Sample and Hold means for transforming portions of said carrier wave amplitude to digital signals, and timing means for synchronizing said trigger signals with the peak digital signal generated simultaneously therewith.

2. The detector according to claim 1 wherein said analog-to-digital encoder means includes means to sequentially encode, store, and erase the amplitude for each of said consecutive intervals and said timing means includes an output gate means responsive to said trigger signal to extract only said peak signal.

3. The detector according to claim 1 wherein said timing means includes a recording means to store said digital signals and trigger signals in a recording medium with each of said trigger signals located adjacent a peak digital signal.

4. The detector according to claim 1 wherein said encoder means is coupled to said common input by means of an additional Sample and Hold circuit.

5. The detector according to claim 1 including high speed switching means for coupling said encoding means sequentially to the output of each of said Sample and Hold means.

6. The detector according to claim 1 wherein the timing means includes a counting means for producing a time interval signal for indicating the time interval between successive peaks and a recording means for storing the time interval signal together with said digital signals with each of said time interval signals located adjacent a peak signal.

References Cited in the file of this patent

UNITED STATES PATENTS

| | | |
|---|---|---|
| 2,946,044 | Bolgiano et al. | July 19, 1960 |
| 2,947,971 | Glauberman | Aug. 2, 1960 |